(12) United States Patent
Grutter

(10) Patent No.: US 6,480,509 B1
(45) Date of Patent: Nov. 12, 2002

(54) COMMUNICATION SYSTEM USING A COMPRESSED CONNECTION

(75) Inventor: Hendrikus J. Grutter, Hilversum (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/431,580

(22) Filed: Nov. 1, 1999

(30) Foreign Application Priority Data

Nov. 2, 1998 (EP) .............................................. 98203688

(51) Int. Cl.[7] .................................................. H04J 3/18
(52) U.S. Cl. ...................................................... 370/477
(58) Field of Search ................................ 370/477, 352, 370/401, 351, 468, 229–236, 389, 466–471; 382/244–248, 251, 233, 232, 239; 455/428, 12.1; 348/401; 379/88.1, 127.01; 345/555–559, 582, 501–503; 375/240, 219, 67.1, 68, 69; 709/231–236

(56) References Cited

U.S. PATENT DOCUMENTS

| | | | |
|---|---|---|---|
| 4,823,342 A | 4/1989 | Morita et al. ................ | 370/109 |
| 5,682,386 A | * 10/1997 | Arimilli et al. .............. | 370/468 |
| 6,031,573 A | * 2/2000 | MacCormack et al. ..... | 348/401 |

FOREIGN PATENT DOCUMENTS

| | | | |
|---|---|---|---|
| EP | 0202422 | 11/1986 | ............. H04J/3/17 |
| WO | WO9816083 | 4/1998 | ........... H04Q/11/04 |

* cited by examiner

*Primary Examiner*—Kwang Bin Yao
*Assistant Examiner*—Prenell Jones
(74) *Attorney, Agent, or Firm*—Daniel J. Piotrowski

(57) ABSTRACT

In a communication system the quality of transmission is improvied with an arrangment including a first node having compression processor that derives from a plurality of source signals a plurality of compressed source signals and a multiplexer for multiplexing said plurality of compressed source signals into a multiplex signal, the first node transmits the multiplex signal to a second node, the second node has a demultiplexer for demultiplexing the multiplex signal into the plurality of compressed source signals and decompression processor that derives the source signals from the compressed source signals. The compression processor is arranged for variable compression that compresses the source signals in dependence on an aggregate rate of the source signals that are transmitted and the decompression processor is arranged for variable decompression that decompresses the signals received from the demultiplexer to obtain the source signals.

8 Claims, 4 Drawing Sheets

COMMUNICATION SYSTEM USING A COMPRESSED CONNECTION

The present invention relates to a communication system comprising a first node having compression means for deriving from a plurality of source signals a plurality of compressed source signals and a multiplexer for multiplexing said plurality of compressed source signals into a multiplex signal, the first node comprises transmission means for transmitting the multiplex signal to a second node, the second node comprises a demultiplexer for demultiplexing the multiplex signal into said plurality of compressed source signals.

The present invention also relates to a node for use in such a communication system.

A communication system according to the preamble is known from International Patent Application published under No. WO 98/16083.

In the past networked PBX's have been introduced, in which a plurality of PBX's are interconnected via a communication link in order to obtain a larger virtual switch. The PBX's can be at different locations, which can be in different cities and even in different countries. The communication link often comprises a connection over a public telephone network (PSTN).

A substantial part of the operational costs of the network of interconnected PBX's is constituted by the costs of the interconnections between the PBX's charged by the operator of the public telephone network. To reduce said costs often compression means are used to compress the signals to be transmitted, making that more signals can be transmitted over a link having a predetermined capacity. In case of voice signals the speech signal is dependent on the compression ratio used in the compression means. The use of compression will result in a degradation of the speech quality which depends on the amount of compression. Consequently the use of compression will result in some degradation of the transmission quality of the communication system.

The object of the present invention is to provide a communication system according to the preamble in which the transmission quality of the communication system has been improved.

To achieve said object, the communication system is characterized in that the compression means are arranged as variable compression means for compressing the source signals in dependence on an aggregate rate of the source signals to be transmitted and in that the decompression means are arranged as variable decompression means for decompressing the signals received from the demultiplexer to obtain the source signals.

If the compression is made dependent on an aggregate rate of the signals to be transmitted over a given communication link, it is obtained that the compression ratio is never more that is really needed to be able to transmit the required amount of signals over the transmission link. If there is heavy traffic a large compression ratio is used, resulting in some degradation of the quality of the transmitted signals. If there is only light traffic, a small compression ratio or even no compression at all is used, resulting in an improvement of the quality of the transmitted signals.

An embodiment of the invention is characterized in that the compression means are arranged for selecting one out of a plurality of compression ratios for the source signals.

The adjustment of the compression ratio by selecting one out of a plurality of compression ratios can easily be done by changing the compression and decompression methods. This is easier to perform than gradually changing the compression ratio of a single compression method.

A further embodiment of the invention is characterized in that said plurality of compression ratios differ by an integer factor. By choosing compression ratios that differ by an integer factor, it becomes easier to add an additional source signal to the multiplex signal to be transmitted. It is then possible to replace one existing signal in the multiplex signal by two or more signals having the same aggregate bitrate than the single signal that is replaced. The two or more signals in the multiplex can now be used to carry the replaced source signal and the additional source signal.

The present invention will now be explained with reference to the drawings.

Figure 1:
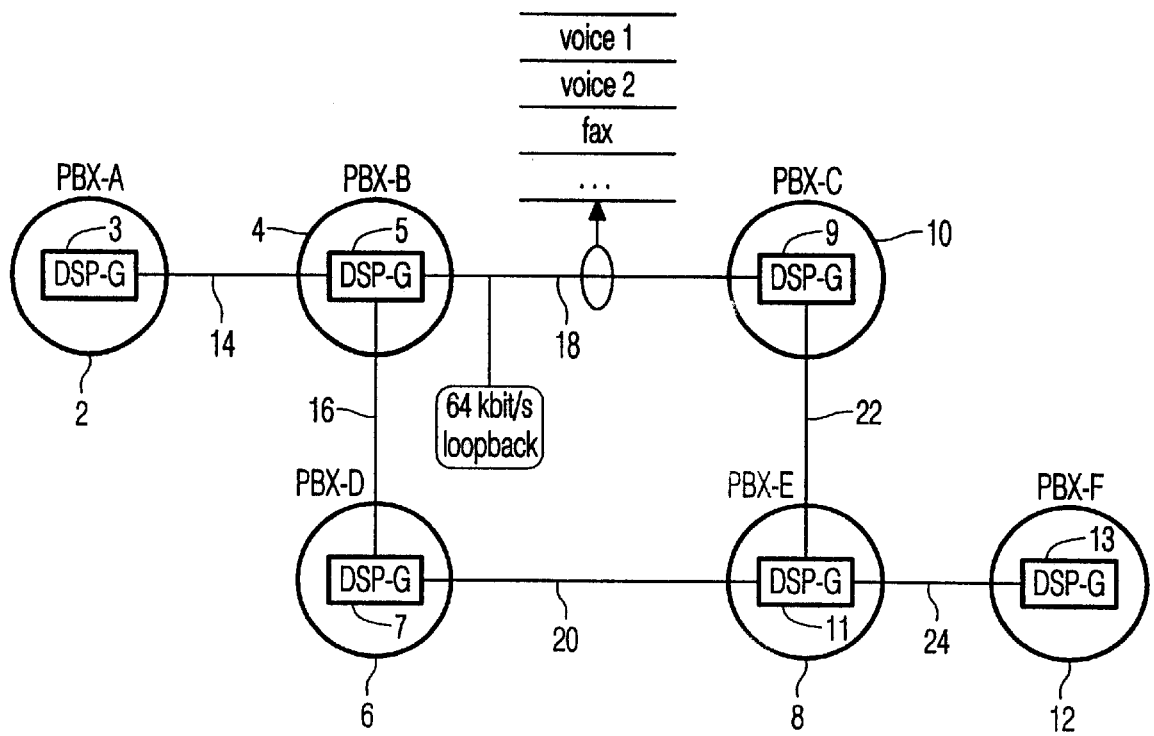
FIG. 1 shows a communication system comprising a plurality of networked PBX's.

The communication system according to FIG. 1 comprises a plurality of PBX's 2, 4, 6, 8, 10 and 12. The respective PBX's 2, 4, 6, 8, 10 and 12 comprise a compression server 3, 5, 7, 9, 11 and 13. The PBX's are interconnected via 64 kbit/sec channels 14, 16, 18, 20 and 24. The compression servers can compress speech signals to be transmitted according to several compression algorithms, such as G.728, G.729. They also comprise compression algorithms dedicated for fax signals according to several standards such as V.17, V.29 and V.21 and modem signals according to several standards such as V.34, V32 and V.22.

Each of the channels is able to carry a plurality of compressed voice and data signals. The setup according to FIG. 1 is extensively used to reduce the costs of the channels 14, 16, 18, 20 and 24 which are generally routed via a public telephone network. Without using compression, the required capacity of the channels between the PBX's should have been substantially larger than presently is the case.

According to the inventive idea of the present invention, the compression ratio, and consequently the number of source signals is increased in dependence on the required amount of traffic between two interconnected PBX's. This results in a substantial increase of the capacity of the channel, at the cost of a small deterioration of the transmission quality under heavy traffic conditions.

Figure 2:
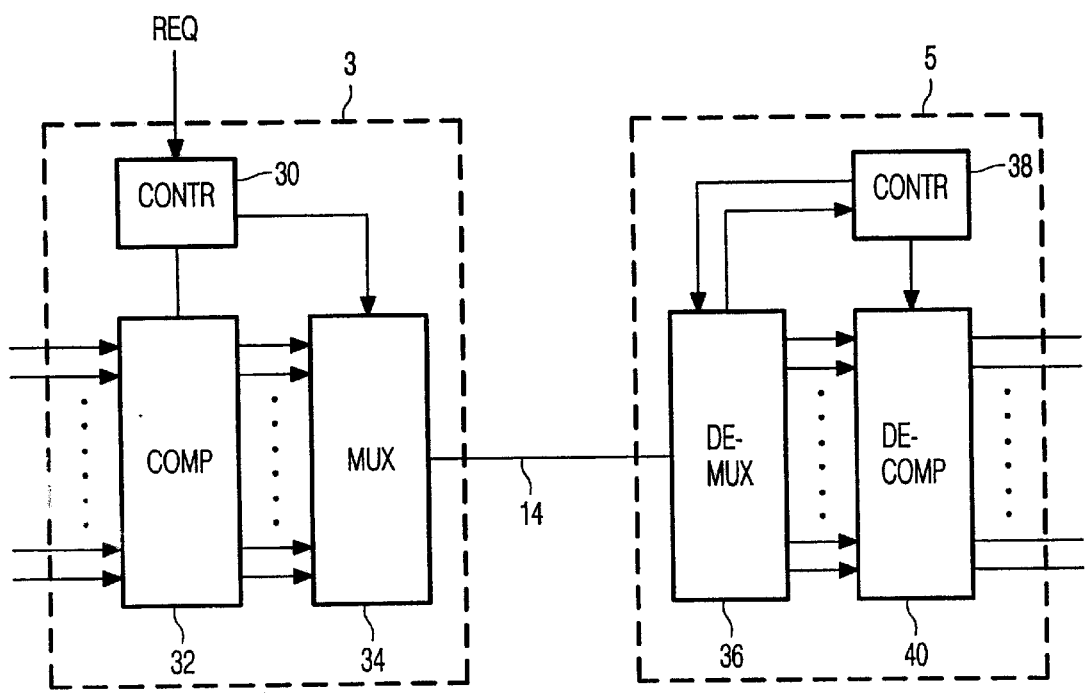
FIG. 2 shows a block diagram of a transmission system according to the invention.
Figure 3:
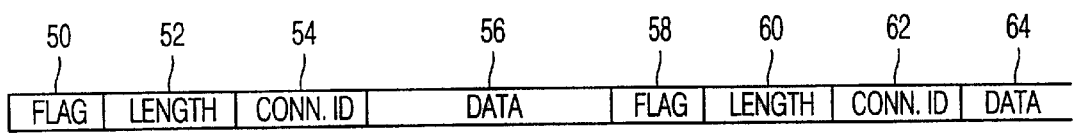
FIG. 3 shows a frame structure used to carry a multiplex signal used in the transmission system according to the invention.

FIG. 2 shows the compression servers 3 and 5 interconnected via the transmission link 14 in more detail. A plurality of source signals is applied to corresponding inputs of a compression processor 32. The compression method to be used for each of the active input signals of the compression processor is determined by a controller 30. The controller 30 receives from the switching core of the PBX a signal for requesting new connections or requesting the release of existing connections.

In the following it will be assumed that three possible compression methods can be used for voice transmission i.e. G.728 (16 kbit/s), G.729 (8 kbit/s) and a sinusoidal coder called Harmony (4 kbit/s). G.728 and G.729 will be well known for those skilled in the art. It is further assumed that at least 8 kbit/sec are needed for exchanging signaling information ween the interconnected compression servers 3 and 5.

In the table below, the number of channels using each of the compression methods is given as function of the total number of requested connections.

TABLE 1

| # requested ch. | # G.728 ch. | # G.729 ch. | # Harmony ch. | Total Bitrate |
|---|---|---|---|---|
| 1 | 1 | 0 | 0 | 16 kbit/s |
| 2 | 2 | 0 | 0 | 32 kbit/s |
| 3 | 3 | 0 | 0 | 48 kbit/s |
| 4 | 2 | 2 | 0 | 48 kbit/s |
| 5 | 2 | 3 | 0 | 56 kbit/s |
| 6 | 1 | 5 | 0 | 56 kbit/s |
| 7 | 0 | 7 | 0 | 56 kbit/s |
| 8 | 0 | 6 | 2 | 56 kbit/s |
| 9 | 0 | 5 | 4 | 56 kbit/s |
| 10 | 0 | 4 | 6 | 56 kbit/s |
| 11 | 0 | 3 | 8 | 56 kbit/s |
| 12 | 0 | 2 | 10 | 56 kbit/s |
| 13 | 0 | 1 | 12 | 56 kbit/s |
| 14 | 0 | 0 | 14 | 56 kbit/s |

The compressed signals at the output of the compression processor 32 are applied to corresponding inputs of a multiplexer 34. The multiplexer 34 assembles a frame comprising the output signals from the compression processor 32 and signaling information from the controller 30. Because the bitrate of each of the output signals from the compression processor can vary, a flexible frame structure has to be used.

The output signal of the multiplexer 36 is transmitted via the channel 14 to an input of a demultiplexer 36 in the compression server 5. The demultiplexer 36 is arranged for demultiplexing its input signal into the compressed source signals and a control signal. The compressed source signals are applied to a decompression processor 40 and the control signal is applied to a controller 30.

The decompression processor 40 decompresses its input signal according to the appropriate decompression algorithm as indicated by a selection signal provided by the controller 38. The decompression algorithm to be used for each of the channels is derived by the controller 38 from the control signal received from the multiplexer 36. The controller 38 issues also a frame selection signal to the demultiplexer 36, indicating a change in the constitution of the frame received from the channel 14.

The decompressed signals are provided to the switching core of the PBX for routing to the final destination.

The frame structure according to FIG. 2 comprises a continuous stream of packets, some of them being assigned to a connection. The packet starts with a flag field 50, which carries a synchronization sequence. The synchronization sequence can be used for determining the beginning of a new packet. According to an aspect of the present invention, the length of the flag field 50 is variable and can even be zero. This length can be made dependent on total required bandwidth on the transmission link. The length of the flag field is determined by use of a table of which Table 2 is an example.

TABLE 2

| Entry | Length of flag field |
|---|---|
| 1, 2 | 8 bits |
| 3, 4 | 4 bits |
| >4 | 0 bits |

The flag field 50 is followed by a length field 52 indicating the number of bits carried by the data field 56 in the packet. If the first bit of the length field 52 is equal to "0", the data field 56 has a predefined length. In said case, the length field 52 only consists of one bit with value "0". If the first bit of the length field is equal to "1", the length of the data field 56 is described by the n next bits in the length field 52.

After the length field 52, the connection ID field 54 is transmitted. The connection ID field 54 identifies the connection to which the data in the data field 56 belongs. One connection ID is reserved for peer to peer communication between the controllers 30 and 38 in order to be able to exchange control information between them. Finally the data field 56 is transmitted which carries the compressed source signals. The length field 52 indicates the length of the data field 56.

Figure 4:
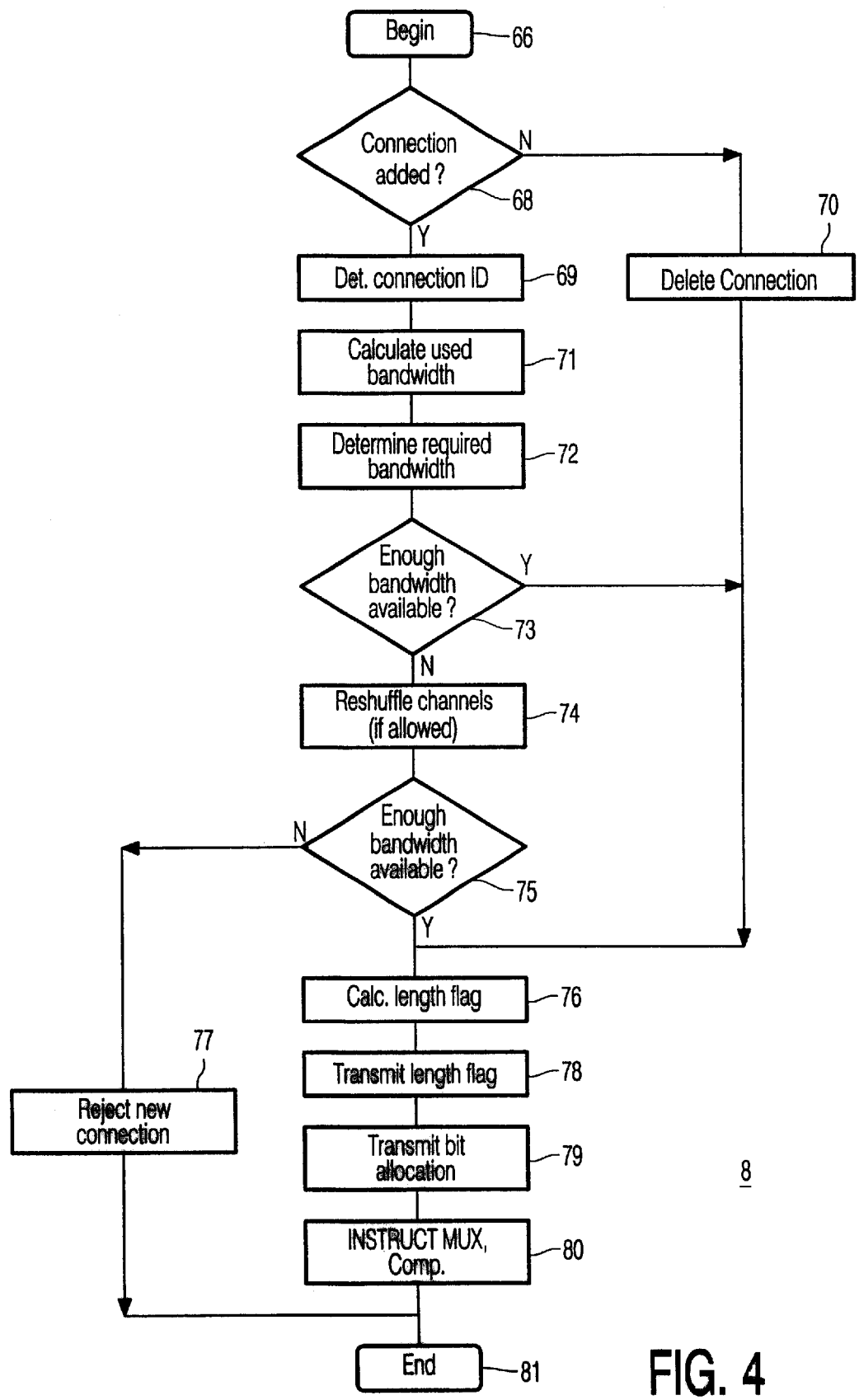
FIG. 4 shows a flowgraph of a program for a programmable processor to implement the controller 30 used in the compression server 3 in the system according to FIG. 1.

In the flowgraph according to FIG. 4, the numbered items have the following meaning:

| No | Inscription | Meaning |
|---|---|---|
| 66 | BEGIN | Begin of the program |
| 68 | CONNECTION ADDED ? | It is determined whether a new connection is to be added. |
| 69 | DET. CONN. ID | The connection ID of the new connection is determined. |
| 70 | DELETE CONNECTION | The superfluous connection is deleted. |
| 71 | CALCULATE USED BANDWIDTH | The total bandwidth of all the channels is calculated |
| 72 | CALC BITRATE | The aggregate bitrate of all the connections is calculated. |
| 73 | ENOUGH BANDWIDTH ? | It is checked whether there is sufficient bandwidth available for a new connection |
| 74 | RESHUFFLE CHANNELS | Assign different bandwidth to the active channels. |
| 75 | ENOUGH BANDWIDTH ? | It is checked whether there is sufficient bandwidth available for a new connection |
| 76 | CALC LENGTH FLAG | The length of the flag field is determined. |
| 77 | REJECT NEW CONNECTION | A requested new connection is rejected. |
| 78 | TRANSMIT LENGTH FLAG | The length of the flag field is transmitted. |
| 79 | TRANSMIT BIT ALLOCATION | The new bit allocation is transmitted. |
| 80 | INSTRUCT MUX, COMP. | The compression processor and the multiplexer are informed about the new bit allocation. |
| 81 | END | The program is terminated. |

The program according to the flowgraph of FIG. 4, is started when one or more new connections have to be added or deleted from the multiplex signal transmitted between two PBX's. This is done in response to a signal from the switching core of the PBX indicating that a new connection between two PBX' has to be set up, or that an existing connection between the PBX's has to be closed. In instruction 66 of the program according to FIG. 4 an initialization takes place.

In instruction 68 it is checked whether there has a connection to be added or to be deleted from the multiplex to be transmitted.

If one or more connections have to be added, in instruction 69 a connection ID is assigned to these connections, and an input of the compression processor 32 is assigned to said connection ID. In instruction 71 the aggregate bitrate of the presently active channels are calculated by adding the individual bitrates.

If one or more connections have to be deleted, in instruction 70 the inputs of the compression processor 32 corresponding to said ID's is freed, and the compressed source signals with a connection ID corresponding to the connections to be deleted are removed from the multiplex.

In instruction 72 the bandwidth required for the new connection to be added is determined. If no restrictions are imposed on the Quality of Service the bitrate for a voice signal can be 4, 8 or 16 kbit/s. Normally the bitrate for the connection to be added will be selected to be equal to the lowest bitrate presently used on the multiplex. If certain Quality of Service demands are associated with the new connection to be set up, the required bitrate is selected according to said Quality of Service.

In instruction 73 it is checked whether the available bandwidth allows the addition of the new connection. If sufficient bandwidth is available, the program is continued at instruction 74. If insufficient bandwidth is available, the bandwidth available for existing connections will be lowered to make bandwidth available for the new call to be added. However in doing this account is taken of Quality of Service requirements. The bitrate of existing connections having certain Quality of Service requirements are not decreased. The amount of channels of which the bitrate has to be reduced is determined from the required bitrate needed for the channel to be added. If e.g. the newly to be added channel requires 4 kbit/sec, the bitrate of an existing 8 kbit/sec channel is reduced to 4 kbit/sec. and the freed 4 kbit/sec. are used for the newly added channel.

In instruction 75 it is checked whether after the reshuffling operation there is sufficient bandwidth available for adding the new channel. If this is not the case, in instruction 77 the new connection is rejected, and the switching core of the PABX should use an alternative connection, such as a dial up connection over the public telephone network. If sufficient bandwidth is available for the new connection to be added, in instruction the length of the flag field in dependence on the aggregate bitrate calculated in instruction 74. If the aggregate bitrate is below a threshold value, the flag field has a nominal value. If the aggregate bitrate is above said value, the length of the flag field is decreased. It is possible that the length of the flag field is reduced to zero, effectively making it non-existent.

In instruction 78 the flag length is transmitted, and in instruction 79 the bit allocation is transmitted. These data are transmitted in a packet with a connection ID corresponding to the connection ID reserved for peer to peer communication between the controllers 30 and 38.

In instruction 80 the compression processor 32 and the multiplexer 34 are informed about the changes they should make in their operation. The compression processor 32 should be informed about the compression scheme to be used for each of its channels. The multiplexer 34 should be informed about the packet format to be used for each output signal from the compression processor 32 and the connection ID to be assigned to said output signal.

Figure 5:
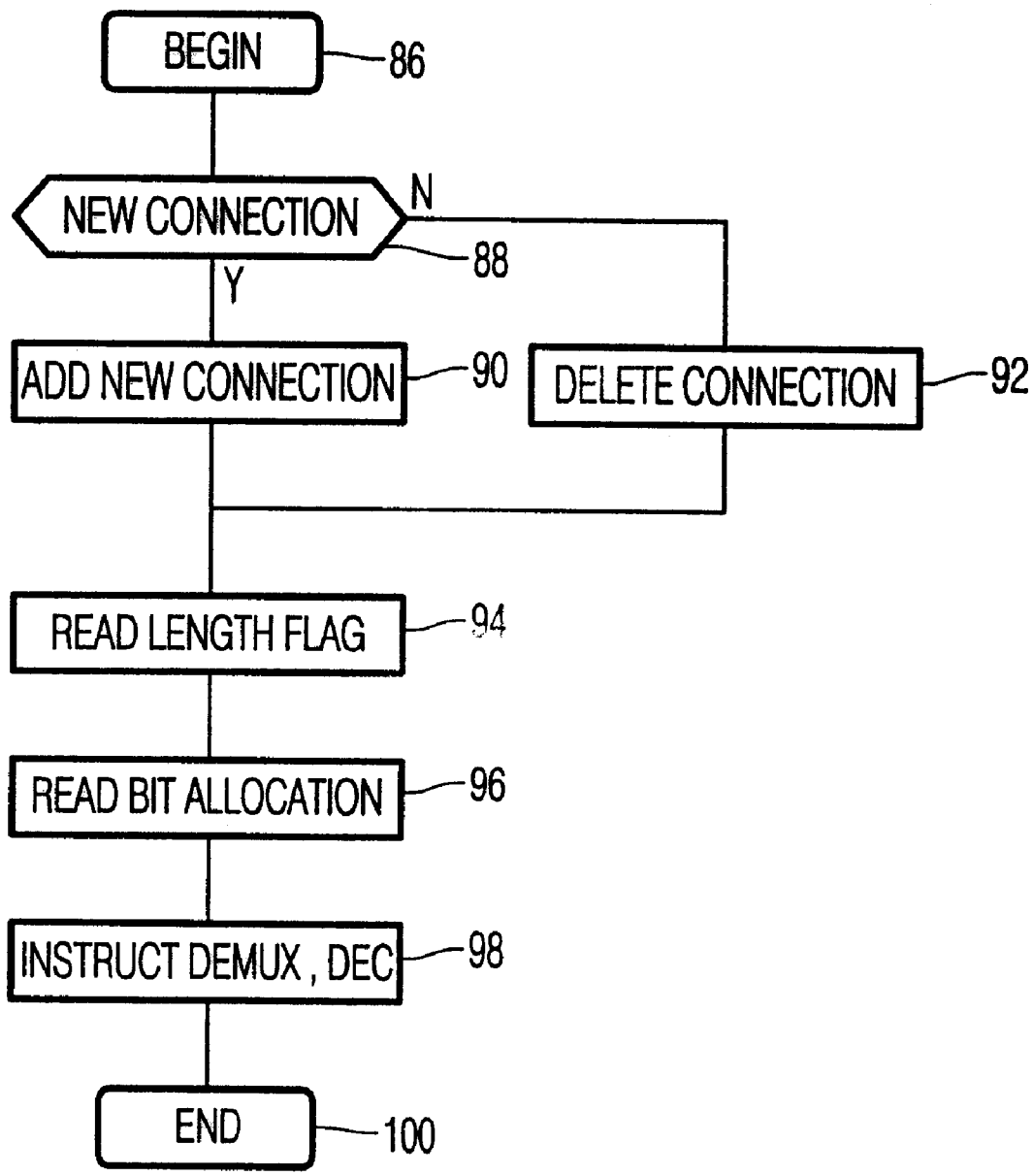
FIG. 5 shows a flowgraph of a program for a programmable processor to implement the controller 38 used in the compression server 5 in the system according to FIG. 1.

In the program according to FIG. 5, the numbered blocks have the following meaning:

| No. | Inscription | Meaning |
|---|---|---|
| 86 | BEGIN | Begin of the program |
| 88 | NEW CONNECTION ? | It is determined if a new connection has to be added. |
| 90 | ADD NEW CONNECTION | A new connection is added. |
| 92 | DELETE CONNECTION | An existing connection is deleted. |
| 94 | READ LENGTH FLAG | The length of the flag field is read. |
| 96 | READ BIT ALLOCATION | The bit allocation to the several channels is read. |
| 98 | INSTRUCT DEMUX, DEC | The demultiplexer 36 and the decompressor 40 are instructed. |
| 100 | END | The program is terminated |

It is assumed that the program according to FIG. 5 is started when the controller 38 receives via the demultiplexer 36 a signal from the controller 30 that a change of the channel assignment takes place.

The program starts with instruction 86 in which an initialization takes place. In instruction 88 it is checked whether a connection has to be added of that a connection has to be deleted. If a connection has to be added, in instruction 90 the necessary measures are taken. This involves storing the connection ID of the new connection to be added, and the updating of a connection table corresponding to Table 3 used in the transmitter. Furthermore, the assignment of a received signal to an input of the decompression processor 36 has to take place. If a connection has to be deleted, the connection is removed from the connection table.

In instruction 94 the length of the flag field is read from the input signal for use by the demultiplexer 36 and in instruction 96 the bit allocation is read. This bit allocation is transmitted in the form of the compression method to be used for each of the logical channels. Alternatively it is possible that the controller 38 uses the connection table it holds for determining the assignment of the compression types to the different channels. This can be done by using a copy of Table 3 in the same way as it is done in the controller 30.

In instruction 98 the new channel assignment is passed to the demultiplexer 36 and the decompression processor 40. At a predetermined instant the demultiplexer 36 and the decompression processor switch to the new configuration. This can e.g. be after the next packet with the connection ID corresponding to the peer to peer connection between the controllers 30 and 38 is received.

Finally the program is terminated in instruction 100.

What is claimed is:

1. Communication system comprising a first node having compression means for deriving from a plurality of source signals a plurality of compressed source signals and a multiplexer for multiplexing said plurality of compressed source signals into a multiplex signal, the first node comprises transmission means for transmitting the multiplex signal to a second node, the second node comprises a demultiplexer for demultiplexing the multiplex signal into said plurality of compressed source signals and decompression means for deriving the source signals from the compressed source signals, characterized in that the compression means are arranged as variable compression means for compressing the source signals in dependence on an aggregate rate of the source signals to be transmitted and in that the decompression means are arranged as variable decompression means for decompressing the signals received from the demultiplexer to obtain the source signals.

2. Communication system according to claim 1, characterized in that the compression means are arranged for selecting one out of a plurality of compression ratios for the source signals.

3. Communication system according to claim 2, characterized in that said plurality of compression ratios differ by an integer factor.

4. Communication system according to claim 3, characterized in that the integer factor is a factor of two.

5. Communication node having compression means for deriving from a plurality of source signals a plurality of compressed source signals and a multiplexer for multiplexing a plurality of compressed source signals into a multiplex signal, the node further comprises transmission means for transmitting the multiplex signal, characterized in that the compression means are arranged as variable compression means for compressing the source signals in dependence on an aggregate rate of the source signals to be multiplexed.

6. Communication node according to claim 4, characterized in that the compression means are arranged to select one out of a plurality of compression ratios for the source signals.

7. Communication node according to claim 5, characterized in that said plurality of compression ratios differ by a factor of two.

8. Communication method comprising deriving from a plurality of source signals a plurality of compressed source signals and multiplexing a plurality of compressed source signals into a multiplex signal, characterized in that the method comprises compressing the source signals in dependence on an aggregate rate of the source signals to be multiplexed.

* * * * *